United States Patent
Yu et al.

(10) Patent No.: US 10,375,676 B2
(45) Date of Patent: Aug. 6, 2019

(54) RADIO RESOURCE SHARING

(71) Applicant: Nokia Solutions and Networks Oy, Espoo (FI)

(72) Inventors: Ling Yu, Oulu (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 246 days.

(21) Appl. No.: 14/398,236

(22) PCT Filed: Apr. 29, 2013

(86) PCT No.: PCT/EP2013/058860
§ 371 (c)(1),
(2) Date: Oct. 31, 2014

(87) PCT Pub. No.: WO2013/164299
PCT Pub. Date: Nov. 7, 2013

(65) Prior Publication Data
US 2015/0085784 A1 Mar. 26, 2015

Related U.S. Application Data

(63) Continuation of application No. PCT/EP2012/058281, filed on May 4, 2012.

(51) Int. Cl.
*H04W 72/04* (2009.01)
*H04W 76/10* (2018.01)
*H04W 16/14* (2009.01)

(52) U.S. Cl.
CPC ....... *H04W 72/0406* (2013.01); *H04W 16/14* (2013.01); *H04W 72/042* (2013.01);
(Continued)

(58) Field of Classification Search
CPC ......... H04W 72/0406; H04W 72/0453; H04W 72/042; H04W 76/02; H04W 16/14; H04W 76/10; H04B 2201/692
See application file for complete search history.

(56) References Cited

U.S. PATENT DOCUMENTS

2011/0002274 A1* 1/2011 Grandblaise .......... H04W 16/14
370/329
2011/0250915 A1* 10/2011 Stanforth .............. H04W 16/14
455/509
(Continued)

FOREIGN PATENT DOCUMENTS

EP 1742427 A2 1/2007
EP 2456250 A1 5/2012
(Continued)

OTHER PUBLICATIONS

Office Action received for Korean Patent Application No. 10-2014-7033908, dated Apr. 18, 2016, 7 pages.
(Continued)

*Primary Examiner* — Kwang B Yao
*Assistant Examiner* — Moo Jeong
(74) *Attorney, Agent, or Firm* — Brake Hughes Bellermann LLP

(57) ABSTRACT

A technique, comprising: controlling a radio transmitter or radio transceiver of a device of a first radio system to transmit to a second radio system information about use of at least one radio resource for one or more transmissions outside the control of the second radio system, wherein said at least one radio resource is also usable for transmissions controlled by the second radio system.

10 Claims, 5 Drawing Sheets

(52) U.S. Cl.
CPC ....... *H04W 72/0453* (2013.01); *H04W 76/10* (2018.02); *H04B 2201/692* (2013.01)

(56) References Cited

U.S. PATENT DOCUMENTS

| | | | | |
|---|---|---|---|---|
| 2012/0039284 | A1* | 2/2012 | Barbieri | H04W 48/10 |
| | | | | 370/329 |
| 2015/0003394 | A1* | 1/2015 | Ono | H04W 72/042 |
| | | | | 370/329 |

FOREIGN PATENT DOCUMENTS

| | | | |
|---|---|---|---|
| KR | 10-2008-0035599 A | | 4/2008 |
| WO | 2011007539 A1 | | 1/2011 |
| WO | 2013164037 A1 | | 11/2013 |

OTHER PUBLICATIONS

"Modification to the draft report on ASA based on WGFM#73 output", CG Coordinator, Feb. 3, 2012, 10 pages.
Study of the ASA concept CGCRS (11)14, 14 (meeting proposal), CEPT ECC CG CRS (11) meeting, Sep. 26, 2011, 9 pages.
Lin, et al, "ASA Licensing Relevant Issues", Nokia Solutions and Networks, Jun. 2011, 17 pages.
International Search Report and Written Opinion for International Application No. PCT/EP2013/058860, dated Dec. 18, 2013, 12 pages.

\* cited by examiner

RADIO RESOURCE SHARING

CROSS-REFERENCE TO RELATED APPLICATION

This application is a national stage entry of PCT Application No. PCT/EP2013/058860, filed on Apr. 29, 2013, entitled "RADIO RESOURCE SHARING", which is hereby incorporated by reference in its entirety. This application also claims priority to PCT Application No. PCT/EP2012/058281, filed on May 4, 2012, which is hereby incorporated by reference in its entirety.

BACKGROUND

Some radio resources used for radio transmissions outside the control of one radio system may also be suited to transmissions under the control of that radio system.

There has been identified the challenge of facilitating the sharing of at least one radio resource between transmissions outside the control of a radio system and transmissions under the control of the radio system.

SUMMARY

There is hereby provided a method, comprising: controlling a radio transmitter or radio transceiver of a device of a first radio system to transmit to a second radio system information about use of at least one radio resource for one or more transmissions outside the control of the second radio system, wherein said at least one radio resource is also usable for transmissions controlled by the second radio system.

According to one embodiment, the method further comprises: controlling said radio transmitter or radio transceiver to transmit a message for initiating a connection with said second radio system, wherein said message includes an indication to said second radio system that said connection is for transmitting information about use of at least one radio resource for one or more transmissions outside the control of the second radio system.

According to one embodiment, said indication comprises a device identifier reserved by the second radio system for a device configured to communicate information to said second radio system about the use of at least one radio resource for one or more transmissions outside the control of the second radio system.

According to one embodiment, said information about use of at least one radio resource for one or more transmissions outside the control of the second radio system comprises a message indicating permission for the use of said at least one radio resource for one or more transmissions under the control of the second radio system, or a message prohibiting the use of said at least one radio resource for one or more transmissions under the control of the second radio system.

According to one embodiment, the method further comprises: controlling a radio receiver or radio transceiver of said device to receive one or more transmissions by said second radio system including information about use of said at least one radio resource for transmissions made under the control of the second radio system.

There is also hereby provided a method, comprising: controlling a radio receiver or radio transceiver of a device of a first radio system to receive one or more transmissions by a second radio system including information about use of at least one radio resource for transmissions made under the control of the second radio system, wherein said at least one radio resource is also used by said first radio system for transmissions outside the control of said second radio system.

There is also hereby provided a method, comprising: controlling a radio receiver or radio transceiver of a second radio system to receive one or more transmissions by one or more devices of a first radio system, wherein said one or more transmissions include information about use of at least one radio resource for one or more other transmissions made by one or more devices of said first radio system, wherein said one or more other transmissions are outside the control of the second radio system and said at least one radio resource is also usable for transmissions controlled by the second radio system; and deciding about use of said at least one radio resource for one or more transmissions controlled by the second radio system, at least partly on the basis of said information.

According to one embodiment, the method further comprises: in response to detecting in a message for initiating a connection with said second radio system an indication to said second radio system that said connection is required for transmitting information about use of at least one radio resource for one or more transmissions outside the control of the second radio system: setting up said connection in a way that distinguishes over connections for one or more other purposes.

According to one embodiment, the method further comprises: limiting said connection to the control plane; or limiting user-plane services for said connection to the transfer of data to and/or from an entity for deciding about use of said at least one radio resource for one or more transmissions controlled by the second radio system; and/or using one or more pre-defined bearer configurations for said connection.

According to one embodiment, the method further comprises: in response to detecting in a message for initiating a connection with said second radio system an indication to said second radio system that said connection is required for transmitting information about use of at least one radio resource for one or more transmissions outside the control of the second radio system: giving priority to the establishment of said connection over the establishment of one or more other connections.

According to one embodiment, said indication comprises a device identifier reserved by the second radio system for a device configured to communicate information about use of at least one radio resource for transmissions outside the control of the second radio system.

According to one embodiment, the method further comprises: controlling a radio transmitter or radio transceiver of said second radio system to make one or more transmissions to one or more devices belonging to said first radio system, said one or more transmissions including information about the use of said at least one radio resource for transmissions made under the control of the second radio system.

There is also hereby provided a method, comprising: controlling a radio transmitter or radio transceiver of a second radio system to make one or more transmissions to one or more devices belonging to a first radio system, said one or more transmissions including information about the use of at least one radio resource for transmissions made under the control of the second radio system, wherein said at least one radio resource is also used by said first radio system for transmissions outside the control of said second radio system.

There is also hereby provided an apparatus comprising: a processor and memory including computer program code, wherein the memory and computer program code are configured to, with the processor, cause the apparatus to: control a radio transmitter or radio transceiver of a device of a first radio system to transmit to a second radio system information about use of at least one radio resource for one or more transmissions outside the control of the second radio system, wherein said at least one radio resource is also usable for transmissions controlled by the second radio system.

According to one embodiment, the memory and computer program code are further configured to, with the processor, cause the apparatus to: control said radio transmitter or radio transceiver to transmit a message for initiating a connection with said second radio system, wherein said message includes an indication to said second radio system that said connection is for transmitting information about use of at least one radio resource for one or more transmissions outside the control of the second radio system.

According to one embodiment, said indication comprises a device identifier reserved by the second radio system for a device configured to communicate information to said second radio system about the use of at least one radio resource for one or more transmissions outside the control of the second radio system.

According to one embodiment, said information about use of at least one radio resource for one or more transmissions outside the control of the second radio system comprises a message indicating permission for the use of said at least one radio resource for one or more transmissions under the control of the second radio system, or a message prohibiting the use of said at least one radio resource for one or more transmissions under the control of the second radio n system.

According to one embodiment, the memory and computer program code are further configured to, with the processor, cause the apparatus to: control a radio receiver or radio transceiver of said device to receive one or more transmissions by said second radio system including information about use of said at least one radio resource for transmissions made under the control of the second radio system.

There is also hereby provided an apparatus comprising: a processor and memory including computer program code, wherein the memory and computer program code are configured to, with the processor, cause the apparatus to: control a radio receiver or radio transceiver of a device of a first radio system to receive one or more transmissions by a second radio system including information about use of at least one radio resource for transmissions made under the control of the second radio system, wherein said at least one radio resource is also used by said first radio system for transmissions outside the control of said second radio system.

There is also hereby provided an apparatus comprising: a processor and memory including computer program code, wherein the memory and computer program code are configured to, with the processor, cause the apparatus to: control a radio receiver or radio transceiver of a second radio system to receive one or more transmissions by one or more devices of a first radio system, wherein said one or more transmissions include information about use of at least one radio resource for one or more other transmissions made by one or more devices of said first radio system, wherein said one or more other transmissions are outside the control of the second radio system and said at least one radio resource is also usable for transmissions controlled by the second radio system; and decide about use of said at least one radio resource for one or more transmissions controlled by the second radio system, at least partly on the basis of said information.

According to one embodiment, the memory and computer program code are further configured to, with the processor, cause the apparatus to: in response to detecting in a message for initiating a connection with said second radio system an indication to said second radio system that said connection is required for transmitting information about use of at least one radio resource for one or more transmissions outside the control of the second radio system: set up said connection in a way that distinguishes over connections for one or more other purposes.

According to one embodiment, the memory and computer program code are further configured to, with the processor, cause the apparatus to: limit said connection to the control plane; or limit user-plane services for said connection to the transfer of data to and/or from an entity for deciding about use of said at least one radio resource for one or more transmissions controlled by the second radio system; and/or use one or more pre-defined bearer configurations for said connection.

According to one embodiment, the memory and computer program code are further configured to, with the processor, cause the apparatus to: in response to detecting in a message for initiating a connection with said second radio system an indication to said second radio system that said connection is required for transmitting information about use of at least one radio resource for one or more transmissions outside the control of the second radio system: give priority to the establishment of said connection over the establishment of one or more other connections.

According to one embodiment, said indication comprises a device identifier reserved by the second radio system for a device configured to communicate information about use of at least one radio resource for transmissions outside the control of the second radio system.

According to one embodiment, the memory and computer program code are further configured to, with the processor, cause the apparatus to: control a radio transmitter or radio transceiver of said second radio system to make one or more transmissions to one or more devices belonging to said first radio system, said one or more transmissions including information about the use of said at least one radio resource for transmissions made under the control of the second radio system.

There is also hereby provided an apparatus comprising: a processor and memory including computer program code, wherein the memory and computer program code are configured to, with the processor, cause the apparatus to: control a radio transmitter or radio transceiver of a second radio system to make one or more transmissions to one or more devices belonging to a first radio system, said one or more transmissions including information about the use of at least one radio resource for transmissions made under the control of the second radio system, wherein said at least one radio resource is also used by said first radio system for transmissions outside the control of said second radio system.

There is also hereby provided an apparatus comprising: means for controlling a radio transmitter or radio transceiver of a device of a first radio system to transmit to a second radio system information about use of at least one radio resource for one or more transmissions outside the control of the second radio system, wherein said at least one radio resource is also usable for transmissions controlled by the second radio system.

There is also hereby provided an apparatus comprising: means for controlling a radio receiver or radio transceiver of a device of a first radio system to receive one or more transmissions by a second radio system including information about use of at least one radio resource for transmissions made under the control of the second radio system, wherein said at least one radio resource is also used by said first radio system for transmissions outside the control of said second radio system.

There is also hereby provided an apparatus comprising: means for controlling a radio receiver or radio transceiver of a second radio system to receive one or more transmissions by one or more devices of a first radio system, wherein said one or more transmissions include information about use of at least one radio resource for one or more other transmissions made by one or more devices of said first radio system, wherein said one or more other transmissions are outside the control of the second radio system and said at least one radio resource is also usable for transmissions controlled by the second radio system; and means for deciding about use of said at least one radio resource for one or more transmissions controlled by the second radio system, at least partly on the basis of said information.

There is also hereby provided an apparatus comprising: means for controlling a radio transmitter or radio transceiver of a second radio system to make one or more transmissions to one or more devices belonging to a first radio system, said one or more transmissions including information about the use of at least one radio resource for transmissions made under the control of the second radio system, wherein said at least one radio resource is also used by said first radio system for transmissions outside the control of said second radio system.

There is also hereby provided a computer program product comprising program code means which when loaded into a computer controls the computer to: control a radio transmitter or radio transceiver of a device of a first radio system to transmit to a second radio system information about use of at least one radio resource for one or more transmissions outside the control of the second radio system, wherein said at least one radio resource is also usable for transmissions controlled by the second radio system.

There is also hereby provided a computer program product comprising program code means which when loaded into a computer controls the computer to: control a radio receiver or radio transceiver of a device of a first radio system to receive one or more transmissions by a second radio system including information about use of at least one radio resource for transmissions made under the control of the second radio system, wherein said at least one radio resource is also used by said first radio system for transmissions outside the control of said second radio system.

There is also hereby provided a computer program product comprising program code means which when loaded into a computer controls the computer to: control a radio receiver or radio transceiver of a second radio system to receive one or more transmissions by one or more devices of a first radio system, wherein said one or more transmissions include information about use of at least one radio resource for one or more other transmissions made by one or more devices of said first radio system, wherein said one or more other transmissions are outside the control of the second radio system and said at least one radio resource is also usable for transmissions controlled by the second radio system; and decide about use of said at least one radio resource for one or more transmissions controlled by the second radio system, at least partly on the basis of said information.

There is also hereby provided a computer program product comprising program code means which when loaded into a computer controls the computer to: control a radio transmitter or radio transceiver of a second radio system to make one or more transmissions to one or more devices belonging to a first radio system, said one or more transmissions including information about the use of at least one radio resource for transmissions made under the control of the second radio system, wherein said at least one radio resource is also used by said first radio system for transmissions outside the control of said second radio system.

According to one embodiment, said at least one radio resource is primarily used for transmissions outside the control of said second radio system.

According to one embodiment, said transmissions outside the control of said second radio system have higher priority over the use of said at least one radio resource than transmissions controlled by said second radio system.

According to one embodiment, said at least one radio resource comprises one or more radio frequency bands shared by the first and second radio systems under an authorised shared access scheme.

According to one embodiment, the second radio system is a radio communication system providing land mobile services.

BRIEF DESCRIPTION OF THE DRAWINGS

Some embodiments of the present invention are described in detail hereunder, by way of example only, with reference to the accompanying drawings, in which.

DETAILED DESCRIPTION

An embodiment of the present invention is described in detail below for the example of an Evolved UTRAN (EUTRAN), but the same technique is also applicable to other kinds of radio access networks.

Figure 1:
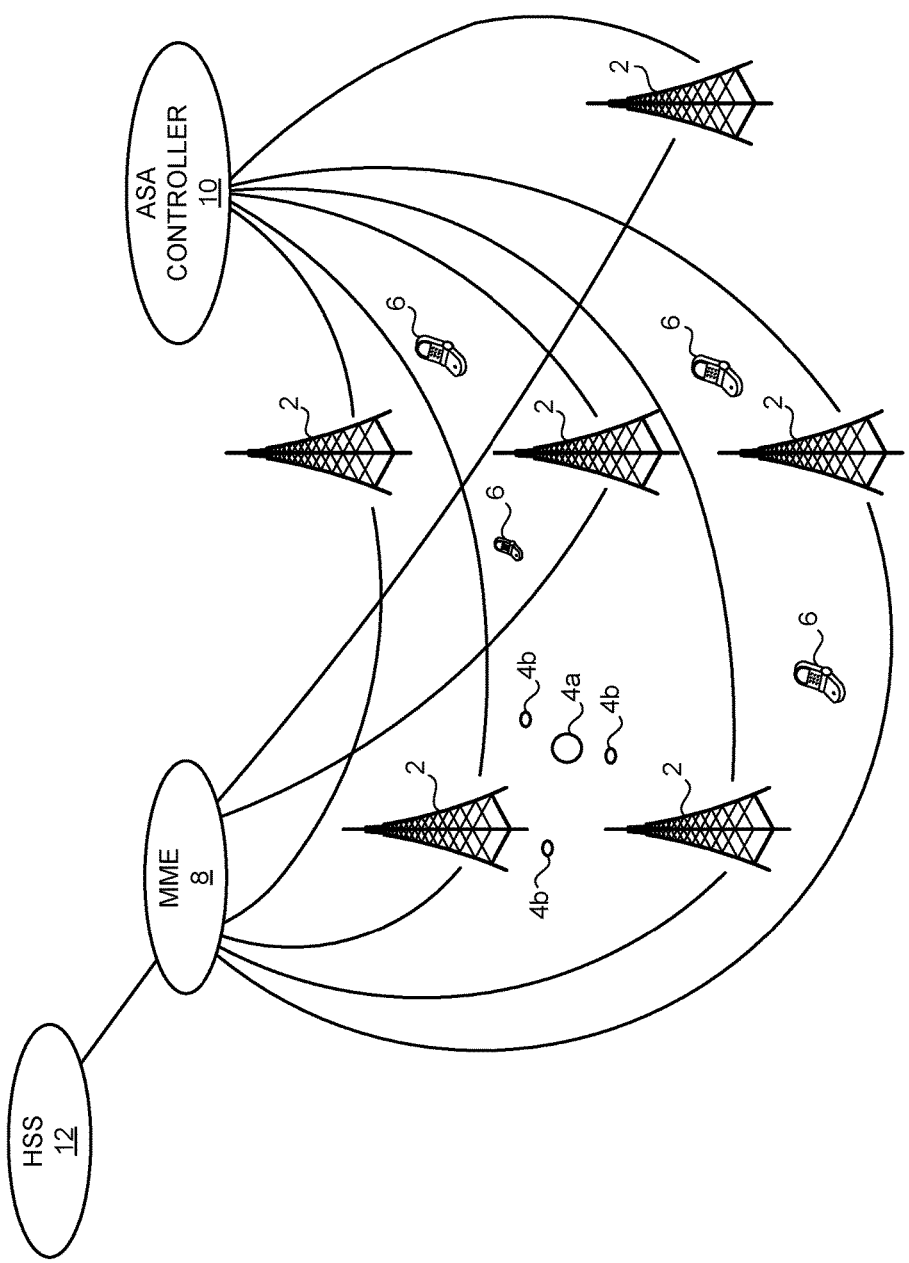
FIG. 1 illustrates an example of a radio access network in which embodiments of the present invention can be implemented.

FIG. 1 illustrates part of the architecture of one example of a cellular communication system in which embodiments of the present invention can be implemented. The cellular communication system includes a plurality of access nodes 2 respectively operating at least one cell.

In this example, the access nodes 2 are base stations (eNodeBs) of a EUTRAN, typically comprising thousands of such base stations, nodes, servers or hosts, each operating one or more cells. The coverage area of each cell depends on the transmission power and the directionality of the antenna by which the cell is operated. Alternatively, the access nodes may be a combination of network entities such as a remote radio head and server or host.

The eNBs 2 are connected to a mobile management entity (MME) 8, which forms part of an Evolved Packet Core (EPC) and whose functions include authenticating devices requesting connections to the network, by interacting with the home subscriber server (HSS) 12. The HSS 12 is a central database that contains user-related and subscription-related information. Together the EPC and EUTRAN form an Evolved Packet System (EPS). The MME 8 is responsible for the generation and allocation of temporary device identifiers to devices served by the Evolved Packet System (EPS).

The eNBs 2 are also connected to an ASA controller 10, whose function and operation is discussed in more detail below. FIG. 1 indicates some kind of connection between the eNBs 2 and the ASA controller 10. ASA controller may be part of an Operations and Maintenance (O&M) system to which the eNBs 2 are connected other than via the EPC (e.g. via the internet). Alternatively, the ASA controller 10 may be a component of the EPC. Alternatively, the ASA controller may be a server which can be accessed via eNB 2 and one or more core network entities (e.g. Serving Gateway (5-GM/Packet Date Network Gateway (PDN-GW) of the EPC). It should be appreciated that the functionalities of an ASA controller may also be carried out at least partially by using cloud services.

FIG. 1 also shows a device 4a within the coverage area of one or more cells of the EUTRAN and configured for making and/or receiving radio transmissions, which transmissions are outside the control of the EUTRAN. According to one example, device 4a is a control unit of a wireless camera network and is configured for receiving and processing wireless transmissions of video data from one or more wireless cameras 4b. According to one other example, device 4a forms part of a military defence communication system. According to another example, the device 4a is an earth-based receiving station of a satellite system, and device 4a receives transmissions not from other earth-based devices but from satellites. According to yet another example, device 4a is a device for transmitting and/or detecting radar signals. In each example, the operation of device 4a is characterised by making/and or receiving transmissions outside the control of EUTRAN, which transmissions are made using at least one radio resource that is primarily for use for transmissions outside the control of the EUTRAN, but is also suitable for transmissions under the control of EUTRAN. For example, the at least one radio resource could be part of the radio spectrum that is licensed to e.g. a wireless camera operator, but which is also suitable for supplementing the part of the radio spectrum licensed to the EUTRAN.

Figure 2:
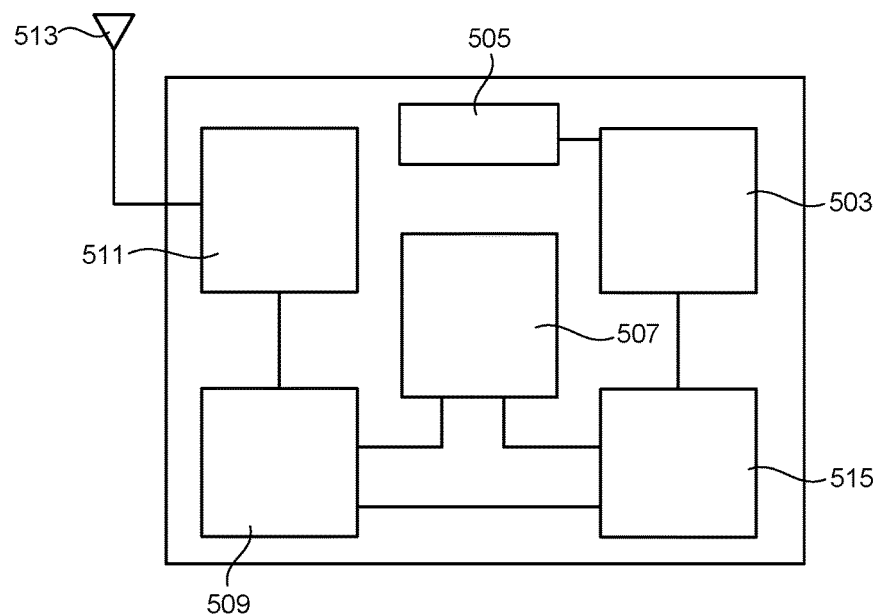
FIG. 2 illustrates an example of apparatus for a device for making both transmissions under the control of the radio access network, and transmissions outside the control of the radio access network.

As discussed below: according to an embodiment of the present invention, device 4a also makes and/or receives transmissions under the control of EUTRAN, but the main function of EUTRAN is to serve user equipment or user devices (UE) 6 that are not part of the e.g. wireless camera network. Only a small number of UEs 6 are shown in FIG. 1, but a EUTRAN would typically serve a very large number of UEs 6. Some examples of user devices (UEs) include mobile phones, smart phones, portable media players, tablets and other portable computer devices etc. FIG. 2 shows one example of apparatus for device 4a for both (i) making and/or receiving transmissions outside the control of the EUTRAN and (ii) making and receiving transmissions under the control of the EUTRAN. Functionality for making and/or receiving transmissions under the control of the EUTRAN is integrated with the functionality for making and/or receiving transmissions outside the control of the EUTRAN. The EUTRAN capabilities are implemented in the device belonging to the radio system involving transmissions outside the control of the EUTRAN. The device 4a includes one or more processors 509 for controlling radio transceiver circuitry, unit or module 511 to make and/or receive transmissions to/from associated devices 4b outside the control of EUTRAN. The transceiver 511 is connected to antenna arrangement 513 comprising at least one antenna or antenna unit. The device 4a also includes a baseband unit comprising one or more baseband processors 515 for controlling second radio transceiver circuitry, unit or module 503 for receiving and making transmissions under the control of EUTRAN via a second antenna or antenna unit 505. The processors 515, 509 are connected to at least one memory or data storage entity 507. The processors 515, 509 and one or more memory entities 507 may be provided on one or more appropriate circuit boards and/or in one or more chipsets. The memory or data storage entity 507 is typically internal but may also be external or a combination thereof.

Figure 3A:
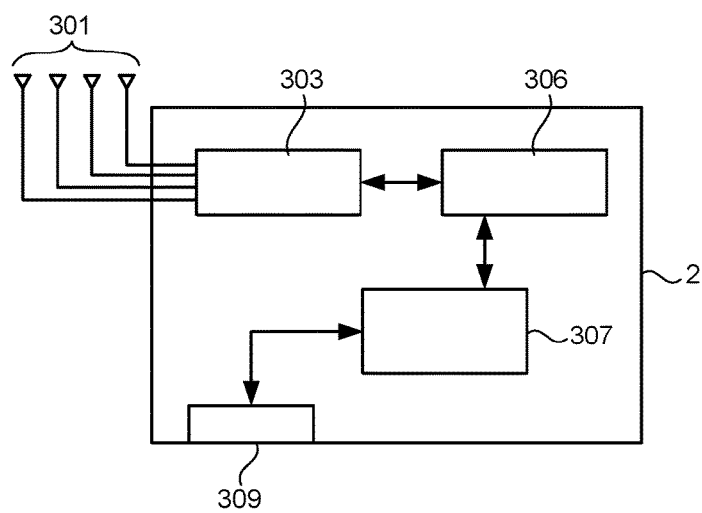
FIGS. 3a and 3b illustrate examples of apparatus for use at an access node in FIG. 1.

FIG. 3a shows one example of apparatus for use at the eNBs 2 of FIG. 1. The apparatus comprises or is coupled to a radio frequency antenna array 301 (comprising at least one antenna or antenna unit) configured to receive and transmit radio frequency signals; radio transceiver circuitry, module or unit 303 configured to interface the radio frequency signals received and transmitted by the antenna array 301; and a baseband unit comprising one or more baseband processors 306. The apparatus usually comprises an interface 309 via which, for example, the baseband processor 306 can communicate with other network elements such as the core network (not shown). The baseband processor 306 is configured to process signals from the radio transceiver 303. It may also control the radio transceiver 303 to generate suitable RF signals to communicate information to UEs 6, device 4a or other eNBs 2 via a wireless communications link, and also to exchange information with other network nodes 8 and/or other eNBs 2 across a wired link via the interface 309. The one or more memory or data storage units 307 are used for storing data, parameters and/or instructions for use by the baseband processor 306. The memory or data storage entity may be internal or external (locating in another network entity) or a combination thereof.

Figure 3B:
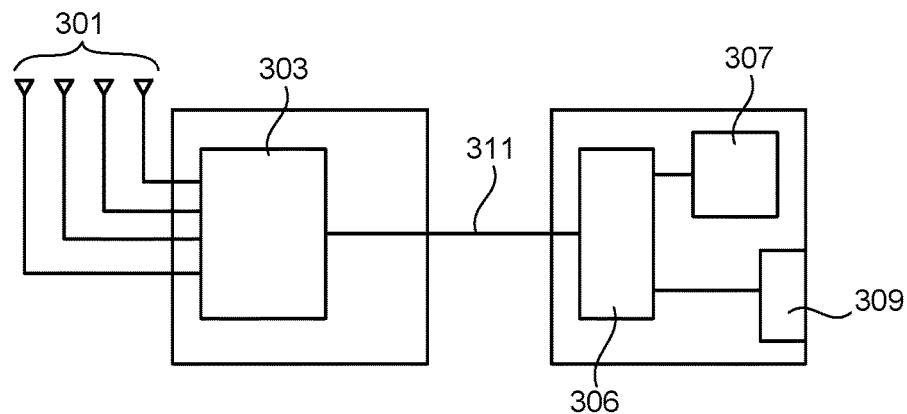

FIG. 3b illustrates another example of apparatus for use at the eNBs 2 of FIG. 1. The apparatus is the same as that of FIG. 3a except that the baseband unit comprising the baseband processor 306 is located remotely from the radio transceiver 303 and the antenna array 301, and is connected to the radio transceiver 303 by e.g. a fibre optic link 311.

Figure 4:
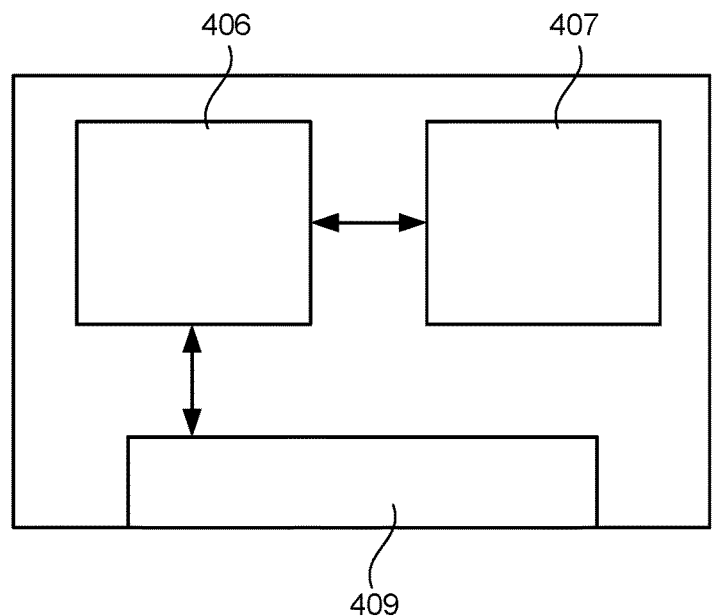
FIG. 4 illustrates an example of apparatus for use at an Authorised Shared Access (ASA) controller in FIG. 1.

FIG. 4 shows an example of apparatus for use at a network entity such as the ASA controller 10. The apparatus 400 includes one or more memories 407 for storing program code, and one or more data processors 406 for controlling the actions described below in accordance with program code stored at the one or more memories 407. The apparatus also comprises an interface 407 via which it can send and receive information to and from other network nodes, such as eNBs 2 and other EPC components.

The memories 307, 407, 507 may be implemented using an suitable data storage technology, such as, for example, semiconductor based memory devices, flash memory, magnetic memory devices and systems, optical memory devices and systems, fixed memory and removable memory. The data processors 306, 406, 515, 509 may, for example, include one or more of microprocessors, digital signal processors (DSPs) and processors based on a multi-core processor architecture.

References below to processors 306, 406, 515, 509 controlling the operation of other elements of device 4a, eNBs 2 and ASA controller 10 refer to the processors operating in accordance with program code stored at memories 307, 407, 507.

It would be appreciated that the apparatus shown in each of FIGS. 2, 3, and 4 described above may comprise further elements which are not directly involved with the embodiments of the invention described hereafter.

According to one embodiment of the present invention, device 4a communicates information to the EUTRAN about the use of a radio resource that is primarily licensed to non-EUTRAN transmissions made by the communication system of which device 4a forms part, but which is also suitable for supplementing the radio resource licensed to the EUTRAN. This radio resource is hereafter referred to as the shared radio resource. Non-EUTRAN transmissions refers to transmissions outside the control of the EUTRAN. Such information communicated from device 4a to the EUTRAN could for example comprise a simple message indicating that EUTRAN is permitted to use the shared radio resource in a certain geographical area for a certain time period (because the shared radio resource is not being used for non-EUTRAN transmissions), or a simple message indicating that EUTRAN is to stop using the shared radio resource (because the shared radio resource is again needed for non-EUTRAN transmissions). Where the geographical area over which the radio system of device 4a extends is pre-defined, these messages sent from device 4a to EUTRAN need not specify the geographical area. The time period for which EUTRAN is permitted to use the shared radio resource may be indicated, for example, by a combination of a starting time and a length of time.

The EUTRAN may be configured to give special treatment to devices with information about the use of a shared radio resource (which devices are hereafter referred to as UE_PUs) over one or more other categories of UEs 6 that do not provide information about a shared radio resource.

Figure 5:
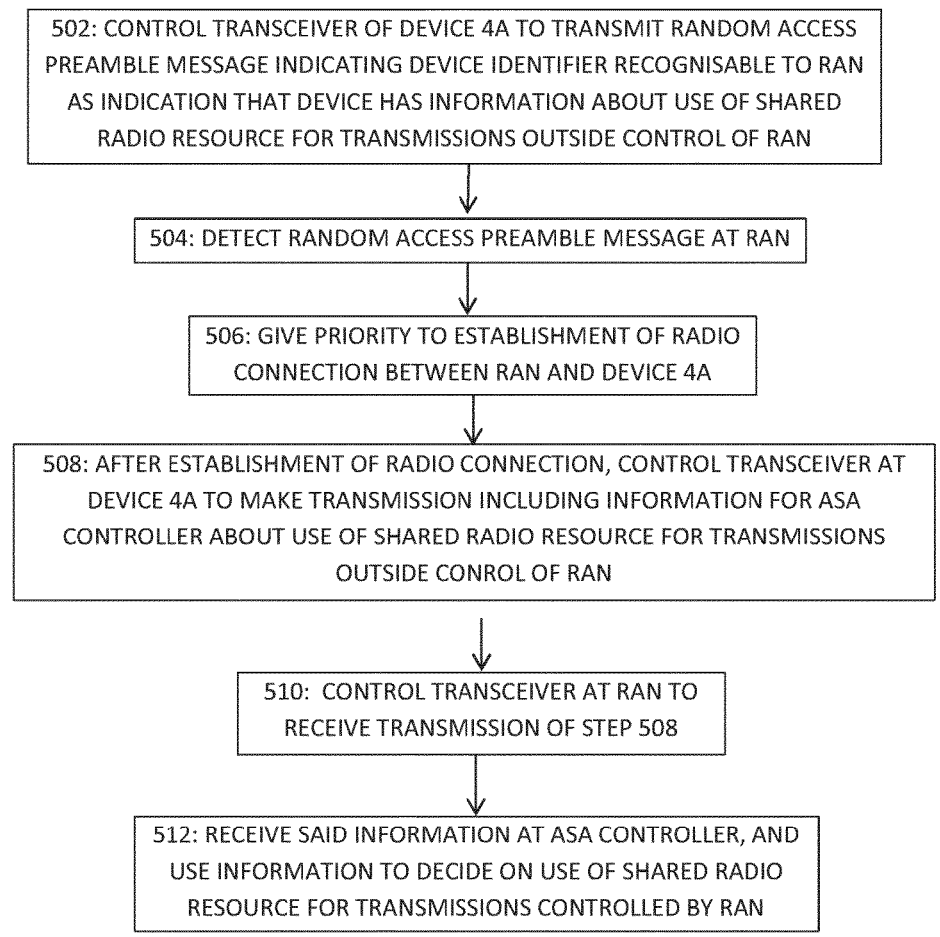
FIGS. 5 and 6 illustrate respective examples of operations according to embodiments of the present invention.

One example of operations at device 4a and the EUTRAN for the communication of this information is illustrated in FIG. 5.

Device 4a is registered with EUTRAN as a special subscriber. A special subscriber profile is created for device 4a at HSS following an agreement between the operator of the EUTRAN and the operator of the other radio system to which device 4a belongs about use of the shared radio resource. As discussed below, the shared radio resource could be part of the radio spectrum that is primarily licensed to the operator of the other radio system (incumbent user), and the agreement with the EUTRAN operator could be part of a sharing scheme such as the Authorised Shared Access (ASA) scheme. The agreement between the incumbent user and the EUTRAN operator may, for example, specify one or more conditions on the use of the incumbent user's radio spectrum by the EUTRAN, and specify the compensation that the incumbent user would receive in return for sharing its radio spectrum with the EUTRAN.

For each type of device identifier (e.g. C-RNTI and M-TMSI used by an eNB or the EPC to distinguish different UEs), device 4a is allocated a special value reserved for UE_PUs. C-RNTI is the Cell Radio Network Temporary Identifier and M-TMSI is the MME-Temporary Mobile Subscriber Identity. One or more special values for device identifiers for UE_PUs may be specified in standardization and stored as hardcode in memory 507 of device 4a, or one or more special values may be semi-statically decided by network components such as the eNB 2 and MME 8 and communicated to UE_PUs by common control signalling (e.g. by broadcasted system information) in those cells in which the shared radio resource is expected to be used. The latter option is particularly useful for UE_PUs that are not stationary devices; a mobile UE_PU randomly selects one of the special device identifier values broadcast by the cell in which it currently resides before starting the initial access procedure. These special device identifier values for UE_PUs facilitate the provision of special treatment to access requests by UE_PUs even before the retrieval and checking of subscriber information from HSS 12. Limitations may be imposed on the services that UE_PUs (UEs that use the above-mentioned special device identifier values to identify themselves to the network) may receive from the network. For example, UE_PUs may be limited to control plane services from the network (with or without mobility support), and may be excluded from all user plane services provided by the network. Alternatively, in the example described below in which the communication of information about the shared radio resource from the UE_PU to the ASA controller relies on a user-plane data connection, the UE_PU may be excluded from all other user-plane services provided by the network. The services available to a UE_PU may be defined statically by standardization, or may be pre-configured semi-statically for an individual UE-PU, based on e.g. subscriber information, when the UE_PU attaches to the EUTRAN.

The access procedure begins with the baseband processor 515 of device 4a controlling the transceiver 503 of device 4a to transmit a random access preamble message comprising a MAC C-PDU including the special C-RNTI value assigned to device 4a or randomly selected by device 4a from a set of special C-RNTI values broadcast by EUTRAN (STEP 502 of FIG. 5).

The baseband processor 306 at the serving eNB 2 controls its transceiver 303 to receive random access preamble messages, and in response to detecting a random access preamble message including a special C-RNTI value (STEP 504 of FIG. 5), the baseband processor 306 handles and accepts the access request with priority over one or more other access requests (STEP 506 of FIG. 5). The UE_PU specific signalling bearer (e.g. radio bearer and S1 bearer for the example of EUTRAN; wherein the 51 bearer is the bearer for the interface between the eNB 2 and MME 8) and any required user-plane bearer may be statically defined by standardization or pre-configured between device 4a and the network so that the radio connection between RAN and device 4a can be established without exchange of explicit signalling and optional user plane bearer configuration information. In this way it reduces signalling overhead for the initial access signalling procedures and speeds up the process of establishing a connection for the communication of information to the ASA controller 10 about the shared radio resource.

According to one example, the communication to the ASA controller 10 of information about the shared radio resource is achieved by control signalling messages/procedures (such as NAS signalling procedures) between device 4a and the ASA controller 10. According to another example, the ASA controller 10 is seen by device 4a as a user plane server, and the device 4a sets up a user plane connection to the ASA controller for communicating information about the shared radio resource to the ASA controller. In either of these examples, the baseband processor 515 at device 4a controls the transceiver 503 of device 4a to make a radio transmission including information for the ASA controller about the shared radio resource (STEP 508); the baseband processor 306 at eNB 2 controls the transceiver 303 of eNB 2 to receive the radio transmission (STEP 510); and the information included in the transmission about the shared radio resource is sent to the ASA controller 10 from eNB 2 via interface 309. A processor 406 at ASA controller 10 receives the information about the shared radio resource, and uses the information to make decisions about use of the shared radio resource for transmissions controlled by the EUTRAN (STEP 512 of FIG. 5). For example, if the information received at ASA controller 10 from device 4a includes a simple message indicating permission to use the shared radio resource, or a simple message indicating a need to use the shared radio resource for transmissions outside the control of the EUTRAN, the ASA controller 10 controls the use of the shared radio resource for EUTRAN transmissions accordingly, for the geographical area and time period for which the message from device 4a is valid.

If device 4a is a mobile device that may move between cells of the EUTRAN, inter-cell handover of device 4a may result in a change to the use of the shared radio resource for EUTRAN transmissions. When device 4a accesses a new EUTRAN cell, device 4a repeats the procedure described above to provide updated information about use of the shared radio resource. According to one example, the possibility to use the shared radio resource for EUTRAN transmissions is predetermined for each possible location in which device 4a might reside (a simple one-to-one mapping relationship between (a) the location of device 4a and (b) whether or not the shared radio resource can be used for EUTRAN transmissions); and the ASA controller 10 controls the use of the shared radio resource for EUTRAN transmissions according to information about the location of device 4a.

Figure 6:
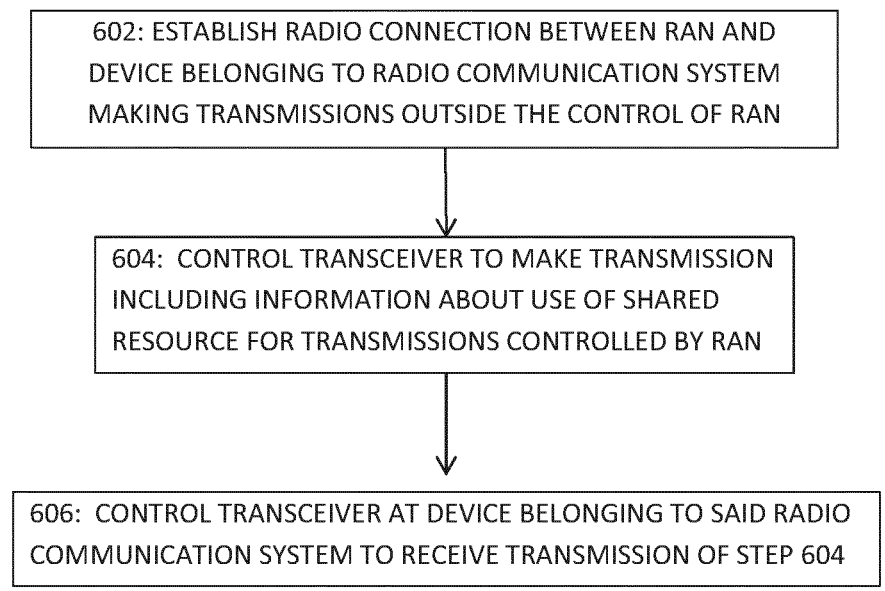

According to another embodiment, device 4a also collects information from the ASA controller 10 about use of the shared radio resource for EUTRAN transmissions, in order to e.g. supervise the use of the shared radio resources for EUTRAN transmissions. One example of operations is shown in FIG. 6. The baseband processor 306 at serving eNB 2 controls the transceiver 303 at serving eNB 2 to make and receive transmissions to/from device 4a including control information for establishing a connection with device 4a (STEP 602 of FIG. 6). In more detail, the connection for receiving such information from EUTRAN about the use of the shared radio resource for EUTRAN transmissions can be established in the same way as described above for connections for transmitting information about use of the shared radio resource for non-EUTRAN transmissions to EUTRAN (see STEPS 502 to 506 of FIG. 5). The connection may be initiated at either device 4a or at EUTRAN. For the example that the connection is initiated at EUTRAN, the baseband processor 306 at eNB 2 may control the transceiver 303 of eNB 2 to transmit a paging message that is recognisable by device 4a to initiate the establishment of a radio connection with the eNB 2, and the process then proceeds in the same way as illustrated in STEPs 502 to 506 of FIG. 5. As part of the establishment of the radio connection or after the establishment of the radio connection, the baseband processor 306 at serving eNB 2 controls transceiver 303 of serving eNB 2 to make a transmission including information for device 4a about use of the shared radio resource for EUTRAN transmissions; and the baseband processor 515 at device 4a controls the transceiver 503 at device 4a to receive said transmission by serving eNB 2. This communication of information from the ASA controller 10 to device 4a may be achieved by control plane signalling procedures or by a user plane data connection.

The above-described techniques are of use, for example, in the scheme known as Authorised Shared Access (ASA), which is a complementary spectrum authorisation scheme for commercial use that is aimed at enabling timely availability of harmonised spectrum for mobile broadband while ensuring predictable quality of service (QoS) for both primary and secondary users.

The program code mentioned above may include software routines, applets and macros. Program code may, for example, be copied into the one or more memories 307, 407, 507 from any apparatus-readable non-transitory data storage medium. Computer program codes may be coded by a programming language, which may be a high-level programming language, such as objective-C, C, C++, C#, Java, etc., or a low-level programming language, such as a machine language, or an assembler.

Alternatively, some of the above-described functions or other functions performed at device 4a, eNBs 2 or ASA controller 10 may be implemented by one or more application specific integrated circuits (ASICs), chip sets, field programmable gate arrays (FPGAs), photonic integrated circuits, etc.

The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:

1. A method comprising:
   transmitting, by a user device, a random access preamble message as an access request to a node controlling a radio access network, the message including a device identifier indicating that the user device has information regarding grant or denial of permission to the radio access network, the permission regarding use of at least one radio resource for transmissions outside control of the node controlling the radio access network, the at least one radio resource being shared under an authorized access scheme;
   establishing a radio connection as a response to the node accepting the access request; and
   after establishing the radio connection, transmitting the information regarding grant or denial of permission to the radio access network for use of the at least one radio resource for an authorized shared access controller controlling the use of the at least one radio resource.

2. The method according to claim 1, wherein the at least one radio resource is primarily licensed for use outside the control of the node.

3. The method according to claim 1, wherein the at least one radio resource is primarily licensed for use outside the control of the node and the use outside the control of the node has a higher priority over the use of the at least one radio resource as controlled by the node.

4. The method according to claim 1, wherein the at least one radio resource comprises one or more radio frequency bands shared under an authorized shared access scheme.

5. The method according to claim 1, wherein transmitting the random access preamble message and transmitting the information regarding grant or denial of permission to the radio access network for use of the at least one radio resource are carried out by using statically defined or pre-configured bearers.

6. An apparatus comprising: a processor and memory including computer program code, wherein the memory and computer program code are configured to, with the processor, cause the apparatus to:
- transmit, by a user device, a random access preamble message as an access request to a node controlling a radio access network, the message including a device identifier indicating that the user device has information regarding grant or denial of permission to the radio access network, the permission regarding use of at least one radio resource for transmissions outside control of the node controlling the radio access network, the at least one radio resource being shared under an authorized access scheme;
- establish a radio connection as a response to the node accepting the access request; and
- after establishing the radio connection, transmit the information regarding grant or denial of permission to the radio access network for use of the at least one radio resource for an authorized shared access controller controlling the use of the at least one radio resource.

7. The apparatus according to claim 6, wherein the at least one radio resource is primarily licensed for use outside the control of the node.

8. The apparatus according to claim 6, wherein the at least one radio resource is primarily licensed for use outside the control of the node and the use outside the control of the node has a higher priority over the use of the at least one radio resource as controlled by the node.

9. The apparatus according to claim 6, wherein the at least one radio resource comprises one or more radio frequency bands shared under an authorized shared access scheme.

10. The apparatus according to claim 6, wherein the memory and computer program code being configured to, with the processor, cause the apparatus to transmit the random access preamble message and transmit the information regarding grant or denial of permission to the radio access network for use of the at least one shared radio resource comprises the memory and computer program code being configured to, with the processor, cause the apparatus to transmit the random access preamble message and transmit the information regarding grant or denial of permission to the radio access network for use of the at least one radio resource by using statically defined or pre-configured bearers.

* * * * *